Oct. 30, 1962  N. K. STENBERG  3,060,739
FLOWMETER CONSTRUCTION
Original Filed Dec. 2, 1955  2 Sheets-Sheet 1
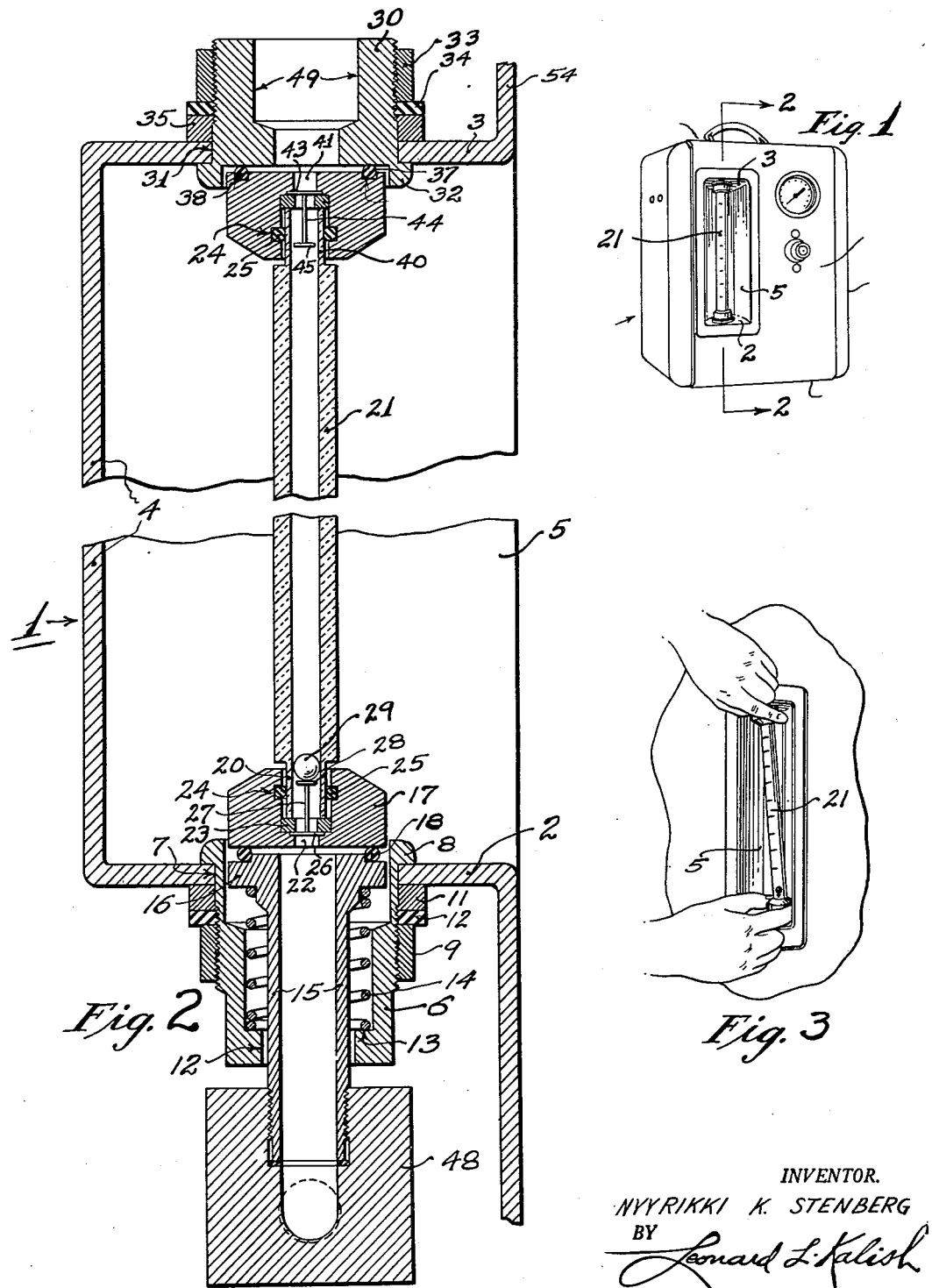
INVENTOR.
NYYRIKKI K. STENBERG
BY
Leonard L. Kalish
ATTORNEY.

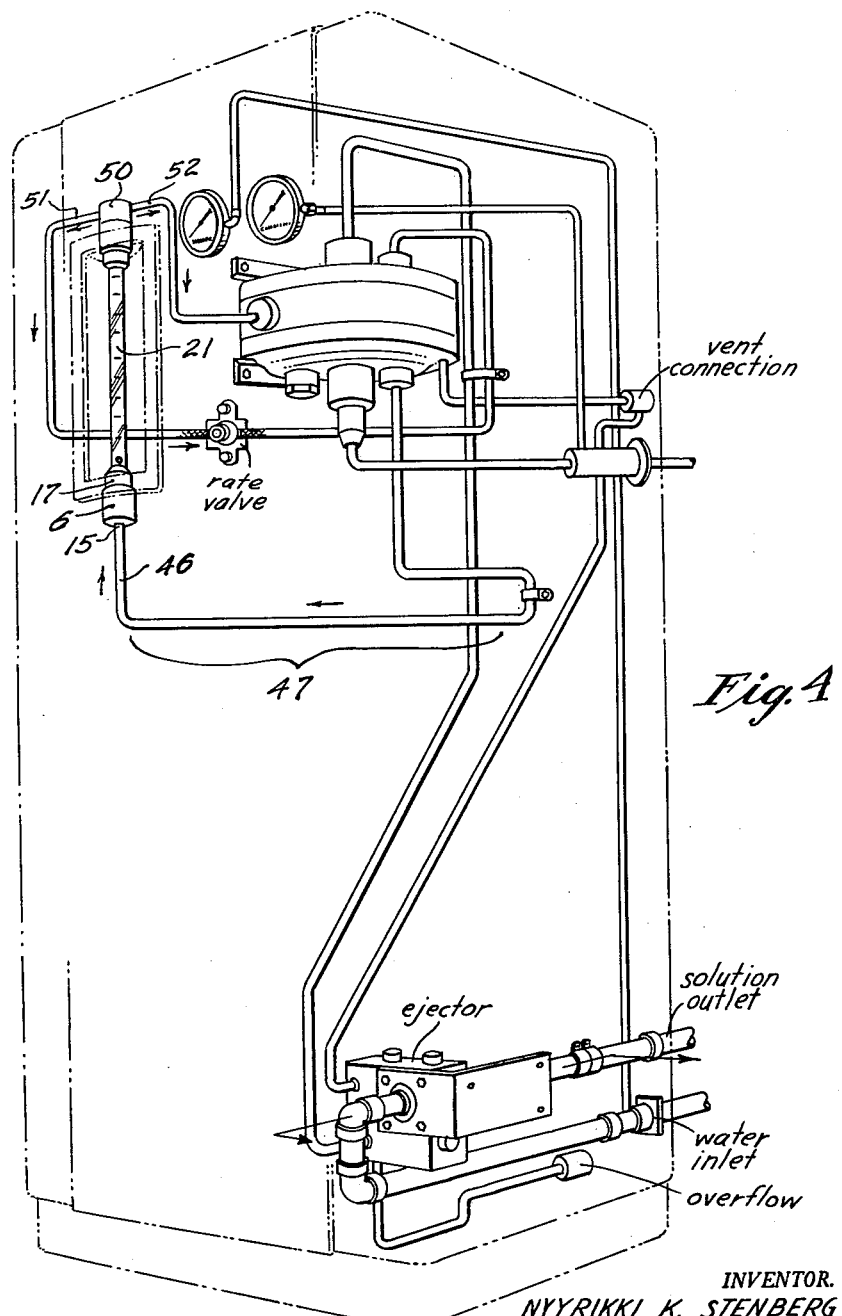

3,060,739
FLOWMETER CONSTRUCTION
Nyyrikki K. Stenberg, Roslyn, Pa., assignor to Fischer & Porter Co., Hatboro, Pa., a corporation of Pennsylvania
Original application Dec. 2, 1955, Ser. No. 550,552, now Patent No. 2,957,494, dated Oct. 25, 1960. Divided and this application Mar. 5, 1959, Ser. No. 800,358
5 Claims. (Cl. 73—209)

The present invention relates to a certain new and useful construction in direct-reading rate-of-flow meters of the variable-orifice type, sometimes called "rotameters," comprising a tapered glass metering tube mounted vertically between lower and upper fittings in any suitable supporting housing which will firmly maintain the fittings in spaced relation to each other and through which (fittings and tapered tube) the fluid is adapted to flow upwardly, and in which tapered metering tube a movable metering member or so-called metering "float" is disposed, whose position or height in the tube is determined by the rate-of-flow of the fluid through the metering tube. Thus, the direct-reading rate-of-flow meters to which the present invention relates are those in which the tapered metering-tube is of glass (or other transparent material) and in which the rate of flow is "read" by visually observing the position of the metering-float through the transparent wall of the metering-tube against a calibrated scale on the tube or on a separate scale member adjacent the tube.

In prior rotameter constructions of this type it has been customary to mount the lower and upper ends of the glass metering-tube in stuffing glands carried by or forming parts of the lower and upper fittings, as illustrated, for instance, in the following United States patents: Fischer and Petsche, No. 2,130,981 issued September 20, 1938, Boehm, No. 2,220,675 issued November 5, 1940, and Porter, No. 2,321,041.

In such heretofore conventional constructions of such of the direct-reading type variable-area rate-of-flow meters, the removal or insertion of the glass metering-tube from or into the "fittings" required a partial or complete disassembly of the meter housing (including the stuffing glands).

The object of the present invention is to permit the insertion and removal of the glass metering-tube into and from the housing without the need for loosening or disassembling any stuffing-glands or the lower or upper fittings in which the ends of the tube are mounted, and to permit the insertion and removal of the glass metering-tube by merely moving the tube axially a small distance against a spring or other resilient and yieldable member, until the other end of the glass metering tube has been withdrawn from its fitting or support or until the adapter at the other end thereof has been withdrawn from its fitting, and then angling or cocking the tube slightly to one side and withdrawing the first-mentioned end of the tube (or its adapter) from its fitting; the insertion of the tube merely being a reversal of the foregoing operations.

For the purposes of illustrating the present invention, there are shown, in the accompanying drawings, an exemplifying embodiment thereof. It is to be understood, however, that the present invention may be embodied in forms and arrangements other than that shown in said drawings.

In the accompanying drawings, in which like reference characters indicate like parts, FIGURE 1 represents a perspective view of a variable-area rate-of-flow meter or rotameter embodying the present invention, as used or installed in a chlorinator for measuring the rate-of-flow of chlorine through the chlorinator.

FIGURE 2 represents a vertical section of the meter on line 2—2 of FIGURE 1, on a much enlarged scale.

FIGURE 3 represents a perspective view of the rate-of-flow meter, showing the manner in which the tube may be inserted or removed by the aforementioned axial movement and cocking of the tube.

FIGURE 4 represents a perspective view of the meter of the embodiment shown in FIGURES 1 to 3, shown as mounted in a supporting pipe-line, as, for instance, in the chlorinator as shown in FIGURE 1.

In the illustrative embodiment shown, the housing 1 is of box-like form, having a bottom or lower terminal wall or supporting member 2 and an upper terminal wall or supporting member 3, and having interconnecting vertical members as, for instance, the rear wall 4 and the side walls 5; the housing being open at least at the front, as indicated particularly in FIGURES 1 to 3. In the illustrative embodiment shown, the housing may be provided with vertical front flanges extending outwardly from the upper and lower walls or supports 2 and 3 thereof and from the side-walls 5 thereof, or the housing 1 may be formed integrally with the housing of whatever instrument or appliance the rotameter is to be used with or in which it is to be mounted, as, for instance, in the housing of a chlorinator or the like as shown in the illustration in FIGURE 2.

Likewise, the housing 1 may be of any other conventional construction providing lower and upper housing or supporting members held in firmly spaced and aligned relationship to each other by any suitable vertical spacing and supporting members intermediate the lower and upper supporting members, in which or to which (lower upper and lower supporting members) tube-receiving fittings can be mounted or affixed.

In the illustrative embodiment shown, a generally tubular member 6 is mounted in an opening 7 in the lower wall or support 2.

The tubular member 6 may be provided with an upper flange 8 to extend over and engage the top of the wall or support 2 and may be threaded externally for the threaded nut or collar 9, which may press against the clamping ring 10 and the resilient washer 11 (between the nut-like collar 9 and the lower face of the wall or support 2), thereby firmly and rigidly to secure the tubular member 6 in or to the lower support 2. The lower end of the tubular member 6 has a smaller bore 12, so as to provide a shoulder 13 to serve as a spring abutment for the lower end of the helical compression spring 14 within the tubular member 6.

Within the tubular member 6, the lower tubular fitting 15 is mounted, with its lower end extending through the reduced diametered bore 12. The fitting 15 has an upper flange 16, against the underside of which the upper end of the spring 14 is adapted to bear, so as resiliently to urge the fitting 15 upwardly. On the upper end of the fitting 15, an adapter or auxiliary fitting 17 is mounted, with a resilient O-ring type sealing-member 18 therebetween. The adapter or auxiliary fitting 17 may be provided with a vertical bore 19 into which the lower cylindrical end 20 of the metering-tube 21 is adapted to extend and in which it is adapted to fit with substantial clearance. Beneath the tube-receiving bore 19, a smaller diametered fluid passageway 22 is provided, and upon the horizontal shoulder between the smaller diametered passageway 22 and the tube-receiving bore 19, an end-thrust washer 23 may be mounted, formed of any suitable slightly resilient gasket material, so that the lower end of the cylindrical portion 22 of the metering-tube 21 may not be damaged by being pressed into contact with the metal or other hard material of the adapter or auxiliary fitting 17.

The adapter or auxiliary fitting 17 is provided with an annular ring-receiving groove 24 in which a fluid-sealing O-ring 25 is operatively mounted, bearing radially against the cylindrical wall-portion of the end 20 of the metering-tube 21 to form a fluid-tight seal between the lower end of the metering-tube 21 and the lower tube-mounting fitting. The O-ring 25 may be of any suitable resilient material inert with respect to the fluid whose rate-of-flow is to be measured or indicated by the rotameter.

Between the end-thrust washer 23 and the aforementioned shoulder in the adapter or fitting 17, a perforated washer or spreader 26 may be mounted, which carries a float-stop rod 27, on the upper end of which a float-support 28 is provided, for supporting the metering-float 29 in its lowermost position, namely, the position generally corresponding to zero flow.

In the upper wall or support 3, a tubular fitting or member 30 is mounted, within the opening 31 therein, with the flange 32 of the fitting 30 bearing against the lower surface of the wall or support 3, and held in place by the nut-like collar or ring 33 threaded on the fitting 30 and pressing against the resilient washer 34 and the ring 35 bearing against the upper surface of the wall or support 3, in a manner similar to the mounting of the tubular member 6 in the lower wall or support 2.

An upper adapter or auxiliary fitting 36 is similarly mounted to the upper fitting 30, with the resilient sealing O-ring 37 interposed between the members 30 and 36 to form a fluid-tight seal therebetween.

The sealing-rings 18 and 37 are held in position by an annular offset in one of the members as shown in the lower end of the meter or by mounting the sealing-ring in an annular ring-receiving groove 38 as shown at the top of the meter.

The fitting 36 may have a similar tube-receiving bore 39, into which the upper cylindrical terminal portion 40 of the metering-tube 21 may extend and into which it fits with substantial clearance. The fitting 36 may have a smaller diametered fluid passageway 41 above the bore 39. An end-thrust washer 42, similar to the washer 23, may be provided in the adapter 36, against which the upper end of the metering-tube 21 may bear. A perforated washer or spreader 43 may be mounted between the washer 42 and the horizontal shoulder in the adapter 36, for supporting a rod 44 extending into the metering-tube 21 and having the upper float-stop 45 thereon for limiting the upper position of the float 29.

The lower end of the lower fitting 15, which extends downwardly from the tubular member 6, may be directly connected to the upstream pipe-line 46 and 47 which is either of flexible tubing or has a sufficiently long unrestrained horizontal span 47 to permit a sufficient vertical movement of the fitting 15 within the tubular member 6, as indicated in FIGURES 2 and 4. If desired, a tube-connector 48 may be affixed to the lower projecting end of the lower fitting 15, to which the downstream pipe 47 may be connected.

The downstream pipe-line may be connected directly to the upper fitting 30, by being screw-threaded into (or otherwise secured to) the bore 49 thereof, or a pipe-connector 50 may be screw-threaded into the bore 49, and a downstream pipe or several downstream pipes, as, for instance, pipes 51 and 52, may be connected to the pipe-connector 50.

By using adapters 17 and 36, which are detachable with respect to the corresponding end-fittings 15 and 30 (though sealed thereto by the O-rings 18 and 37), different sizes of metering tubes may be used in the same meter frame, by merely changing the adapters, namely, by providing adapters with tube-receiving bores 19 and 39 of varying diameters to accommodate the varying diameters of the end portions of the different size tubes. Likewise, the adapters or auxiliary fittings 17 and 36 may be screw-threadedly secured to the fittings or members 15 and 30 for interchangeability. However, if such accommodation of tubes of different sizes or capacities is not desired, the members 17 and 36 can be made integral with or permanently affixed to the corresponding fittings 15 and 30, respectively.

The relationship of the diameters of the cylindrical sealing-wall portions of the ends 20 and 40 of the metering-tube, on the one hand, and the diameters of the telescoping portions of the adapters or fittings 17 and 36, on the other hand, is such that there is sufficient clearance between the telescoped portions of glass tube-ends and tube-mounting adapters or fittings, that the sole radial contacts are between the tube-ends and the resilient O-rings 25; the major portions of which O-rings are nested within the annular receiving-grooves 24 in the adapters or fittings and minor portions of which extend beyond the ring-receiving grooves a sufficient distance to be radially compressed by the sealing-wall portions of the tube-ends and to make firm though resilient contact with such wall-portions of the ends of the metering-tube.

The radial clearance between the cylindrical sealing-walls of the tube-ends 20 and 40 and the radially juxta-posed inner walls of the ring-receiving grooves 24, on the one hand, and the radial width of the cross-section of the sealing-rings 25, on the other hand, is such that the former is sufficiently less than the latter (or the latter is sufficiently greater than the former) so that when the tube-ends 20 and 40 and the fittings 17 and 36 are telescoped with respect to each other, the cylindrical sealing-walls of the tube-ends 20 and 40 will radially compress the sealing-rings 25 in the direction of the ring-receiving grooves 24 and will axially distend the sealing-rings 25, thereby to form a fluid-tight seal between the end-fittings and tube-ends without any other mechanical means (such as screw-tightened stuffing-glands or spring-pressed packing-compressors, or the like, acting axially upon the sealing-rings).

Because of the nature of this radial seal and its comparatively small axial extent or dimension, and because of the clearance between the cylindrical sealing-walls of the tube-ends and the telescoped portions of the end-fitting, the tube-ends may be moved axially with respect to the end-fittings with comparative ease, notwithstanding the fluid-sealing and ring-compressive contact between the sealing-rings and the tube-ends, and such axial movement between tube-ends and end-fittings it is made possible even though the tube is angled with respect to the end-fitting or not-withstanding a substantial deviation of the tube-axis from coaxiality with the axis of the end-fitting.

In the embodiment shown, the separability of the adapters or auxiliary fittings 17 and 36, with respect to the corresponding end-fittings 15 and 30, respectively, aids in the slanting or angling of the metering-tube, when it is desider to insert the tube or to remove the tube, as shown particularly in FIGURE 3. However, by shortening the overlap between the tube-ends and the telescoping portions of the adapters or auxiliary fittings, and by providing a sufficient radial clearance between the telescoped portions of the tube-ends 20 and 40 and the end-fittings, the metering-tube 21 may be slanted or angled sufficiently to permit its insertion and removal, even though the members 17 and 36 are integral with or rigidly secured to the members 15 and 30, respectively.

The chlorinator shown in external perspective view in FIGURE 1 and an external view of whose operative portions is shown in FIGURE 4, is the chlorinator disclosed and forming the subject matter of applicant's co-pending application Serial No. 550,552, filed December 2, 1955, now Patent 2,957,494 issued October 25, 1960, of which the instant application is a division and such chlorinator is shown in the present application merely has an illustrative environment in which the meter construction of the present invention may be used and to show a manner in which the meter of the present invention may be mounted in use. No claim is made herein to the chlorinator.

In FIGURES 1 to 3, the panel designated by the numeral 54 represents the front panel of the chlorinator, although it may represent any other mounting panel or mounting support.

Having shown and described an illustrative embodiment of my invention, I claim the following:

1. A variable-area rate-of-flow meter including a frame, end-fittings carried by said frame in axially spaced and axially aligned relation with each other, a transparent metering-tube between said end-fittings, said metering-tube having a metering-chamber therein of gradually increasing cross-sectional area from one end thereof to the other end thereof, a metering-float within said metering-chamber, a portion of each end-fitting and a terminal portion of the corresponding end of the metering-tube being in telescopically overlapping relation to each other, an annular ring-receiving groove in said telescoped portions of said end-fittings, a resilient annular sealing-ring in each of said ring-receiving grooves with a major portion of its cross-section nested therewithin and with a minor portion of its cross-section extending therebeyond towards and into ring-compressive radial sealing contact with the telescoped portion of the wall-surface of the corresponding end of the metering-tube and forming seals between tube-ends and end-fittings resistant to the passage of fluid therebetween, the radial clearance between the ring-contacted wall-surfaces of the metering-tube and the radially juxtaposed walls of the ring-receiving grooves being sufficiently less than the radial width of the cross-section of the sealing-ring in its uncompressed condition, that upon the telescoping of the tube-ends and the end-fittings with respect to each other, the sealing-rings will be radially compressed and axially distended within their ring-receiving grooves by the ring-contacted wall-surfaces of said metering-tube, said sealing-rings permitting the free axial movement of the tube-ends relative to the end-fittings, and the resistance of said seals between tube-ends and end-fittings, to the passage of fluid therebetween, being independent of any axial end-thrust between tube-end and end-fitting; the end-fittings and metering-tube are arranged in relation to each other for the free axial movability of the metering-tube in relation to the frame a distance sufficient axially to disengage one end of the metering-tube from the frame by an axial movement of the metering-tube in relation to the frame, to permit the subsequent radial displacement of such tube-end in relation to the frame.

2. A variable-area rate-of-flow meter including a frame, end-fittings carried by said frame in axially spaced and axially aligned relation with each other, at least one of said end-fittings including a readily detachable adapter portion which is in fluid-tight sealed relationship thereto when operatively mounted thereto and is in the below-stated telescopically overlapping relation to the metering-tube, a transparent metering-tube between said end-fittings, said metering-tube having a metering-chamber therein of gradually increasing cross-sectional area from one end thereof to the other end thereof, a metering-float within said metering-chamber, a portion of each end-fitting and a terminal portion of the corresponding end of the metering-tube being in telescopically overlapping relation to each other, an annular ring-receiving groove in said telescoped portions of said end-fittings, a resilient annular sealing-ring in each of said ring-receiving grooves with a major portion of its cross-section nested therewithin and with a minor portion of its cross-section extending therebeyond towards and into ring-compressive radial sealing contact with the telescoped portion of the wall-surface of the corresponding end of the metering-tube and forming seals between tube-ends and end-fittings resistant to the passage of fluid therebetween, the radial clearance between the ring-contacted wall-surfaces of the metering-tube and the radially juxtaposed walls of the ring-receiving grooves being sufficiently less than the radial width of the cross-section of the sealing-ring in its uncompressed condition, that upon the telescoping of the tube-ends and the end-fittings with respect to each other, the sealing-rings will be radially compressed and axially distended within their ring-receiving grooves by the ring-contacted wall-surfaces of said metering-tube, said sealing-rings permitting the free axial movement of the tube-ends relative to the end-fittings, and the resistance of said seals between tube-ends and end-fittings, to the passage of fluid therebetween, being independent of any axial end-thrust between tube-end and end-fitting.

3. A flowmeter according to claim 2, in which the radial clearance between the telescoped terminal portion of at least one end of the metering-tube and the telescoped portion of the corresponding end-fitting is sufficiently great to permit the metering-tube to be tilted out of axial alignment with said end-fitting to an extent sufficient to permit the radial displacement of the other end of the metering-tube by an amount which will permit such other end of the tube to be disengaged from its end-fitting.

4. A flowmeter according to claim 1, including axial-thrust-producing resilient means in operative juxtaposition to at least one end of the metering-tube and exerting an axial contacting thrust between at least one of the end-fittings and the corresponding end of the metering-tube.

5. A flowmeter according to claim 4, including axial-thrust-producing resilient means in operative juxtaposition to at least one end of the metering-tube and exerting an axial contacting thrust between at least one of the end-fittings and the corresponding end of the metering-tube.

References Cited in the file of this patent

UNITED STATES PATENTS

| | | |
|---|---|---|
| 1,246,752 | Kelley | Nov. 13, 1917 |
| 1,481,202 | Hildreth | Jan. 15, 1924 |
| 2,321,041 | Porter | June 8, 1943 |
| 2,882,725 | Goodhue et al. | Apr. 21, 1959 |

FOREIGN PATENTS

| | | |
|---|---|---|
| 138,357 | Germany | Feb. 5, 1903 |
| 596,438 | Great Britain | Jan. 5, 1948 |